United States Patent [19]

Vogg et al.

[11] Patent Number: 5,356,250
[45] Date of Patent: Oct. 18, 1994

[54] LOCKING DEVICE FOR SECURING A PIECE OF FREIGHT ON A LOADING FLOOR IN AN AIRCRAFT

[75] Inventors: Guenter Vogg; Juergen Wieck, both of Bremen, Fed. Rep. of Germany

[73] Assignee: Deutsche Aerospace Airbus GmbH, Hamburg, Fed. Rep. of Germany

[21] Appl. No.: 39,811

[22] Filed: Mar. 29, 1993

[30] Foreign Application Priority Data

Apr. 1, 1992 [DE] Fed. Rep. of Germany ....... 4210703

[51] Int. Cl.⁵ .............. B64C 1/20; B60P 1/00; B61D 45/00
[52] U.S. Cl. ....................... 410/86; 410/77; 244/118.1
[58] Field of Search ............... 244/118.1, 137.1, 137.3, 244/118.6; 410/52, 69, 70, 77, 81, 78, 79, 86–90, 94, 92, 107, 111, 117

[56] References Cited

U.S. PATENT DOCUMENTS

| | | | |
|---|---|---|---|
| 2,047,954 | 7/1936 | Fitch | 410/86 |
| 2,519,721 | 8/1950 | Taylor | 410/78 |
| 3,251,314 | 5/1966 | Gutridge | 410/86 |
| 3,796,397 | 3/9174 | Alberti | 244/137.1 |
| 3,986,460 | 10/1976 | Voight et al. | 244/137.1 |
| 5,000,635 | 3/1991 | Jensen et al. | 410/77 |
| 5,104,064 | 4/1992 | Kuitems | 244/118.1 |
| 5,234,297 | 8/1993 | Wieck et al. | 244/118.1 |

FOREIGN PATENT DOCUMENTS 3102146 9/1982 Fed. Rep. of Germany.
3107745 9/1982 Fed. Rep. of Germany.

*Primary Examiner*—Galen L. Barefoot
*Attorney, Agent, or Firm*—W. G. Fasse; W. F. Fasse

[57] ABSTRACT

A locking device for arresting a piece of freight in a loading system for an aircraft is especially adapted for use on an upper deck freight loading system for aircraft that can be retooled, either for passenger service or for freight service. The locking device is releasably secured to support rails extending longitudinally in the loading floor. The locking device has a frame in which a latching hook is mounted for longitudinal displacement against spring biasing forces, whereby the movement of the hook is damped. The latching hook and its latch pawl can be tilted into a recessed position below the floor level. The latch pawl is biased by tension springs to hold the latching hook in its operative position above the floor level.

9 Claims, 1 Drawing Sheet

LOCKING DEVICE FOR SECURING A PIECE OF FREIGHT ON A LOADING FLOOR IN AN AIRCRAFT

FIELD OF THE INVENTION

The invention relates to a locking device for securing a pallet or container to the loading floor in an aircraft. The locking device is particularly suitable for use on a deck in an aircraft which is intended for rapid retooling to carry either passenger seats or pieces of freight as required.

BACKGROUND INFORMATION

Loading floors that are easily retooled are equipped with seating or mounting rails extending lengthwise in the loading floor. Special locking devices are used for securing pieces of freight with a latching hook which is mounted in a frame that in turn is securable in a releasable manner to the above mentioned rails in the floor. Seats are secured to the same rail by screws or clamps.

German Patent Publication (DE-PS) 3,107,745 (Engel et al.), published on Sep. 16, 1982, discloses a locking mechanism for freight loading systems. The known locking mechanism functions as a so-called YZ-latch. A YZ-latch is capable to hold a piece of freight, such as a pallet or container in its loaded condition in the cargo hold in the vertical y-direction, as well as in the lateral z-direction, and to fix the load in the loaded position. For this purpose, such mechanisms are equipped with a latching hook which reaches over a respective projection of the piece of freight such as a pallet or container of standardized dimensions.

Commercial aircraft which are equipped with large freight loading gates to provide access even to the upper deck, are capable of transporting relatively bulky goods. Such goods include, for example, complete propulsion plants which are mounted on a pallet with only a portion of the outer fairing or cowling removed. For transporting such goods, it is especially important that these pieces of freight once inside the aircraft body, do not come into contact with the aircraft body. This is especially important, because damage to the aircraft body and/or to the piece of freight could have serious consequences.

Especially in connection with very long pieces of freight which do not fit crosswise through the freight loading gate so as to be aligned with the longitudinal aircraft axis, it is necessary to move these long pieces initially lengthwise through the loading gate perpendicularly to the longitudinal aircraft axis, and to then rotate such pieces inside the aircraft next to the loading gate by about 90°. In order to perform such rotation, it is necessary to take special safety precautions. These precautions must prevent that a piece of freight does not contact the aircraft body wall opposite of the freight loading gate. German Patent Publication DE 3,102,146 (Engel et al.), published on Sep. 2, 1982, discloses a mechanism for turning freight pallets in order to accomplish, for example, the above mentioned 90° rotation of a large freight piece. This known device comprises a journal or pivoting pin arranged in the area of the freight loading door in the aircraft loading floor. Hardware forming part of a pallet is constructed for cooperation with the journal or pivoting pin. The just mentioned hardware is so positioned on the pallet that it is intended to automatically engage the journal or pivoting pin to thereby cause the rotation of the pallet, for example, by 90°.

OBJECTS OF THE INVENTION

In view of the foregoing it is the aim of the invention to achieve the following objects singly or in combination:

to construct a locking device of the type described above in such a manner that it stops a piece of freight if the above mentioned turn around should not have taken place properly;

to provide a locking device that will stop a piece of freight before it can contact a wall of the aircraft body opposite the freight loading door;

to construct the locking device in such a way that damages to the aircraft body structure and to the piece of freight are reliably prevented by an impact damping action; and to position the present locking device on the loading floor of an aircraft in such a manner that it will stop the motion of a piece of freight in the direction of the Y-axis of the aircraft perpendicularly to its longitudinal or X-axis.

SUMMARY OF THE INVENTION

The locking device according to the invention is releasably securable to the support rails extending lengthwise in the loading floor of an aircraft, whereby at least one locking or latching hook is mounted in a frame which in turn is equipped with securing elements for securing the frame to two support rails in the loading floor, which rails are spaced from one another, and wherein the latching hook is mounted to the frame for a longitudinal displacement relative to the frame in the direction of the Y-axis of the aircraft. Spring elements are arranged to bear against the latching hook and to yield within a limited range to the movement of the latching hook in the Y-direction.

The locking device according to the invention is secured to the support rails in the loading floor of the aircraft in an area next to the freight loading gate, whereby the contact surfaces of the latching hook of the present device are so oriented as to face a piece of freight coming in through the loading gate, whereby the piece of freight contacts the latching surfaces for limiting movement of the piece of freight in the Y-direction of the aircraft.

Instead of using the present locking mechanism, as just described in the area next to the loading gate, the present device can also be effectively used in other areas of the freight loading system wherever a motion of the piece of freight requires damping so as to avoid an abrupt impact as is the case with conventional locking devices. By selecting the spring constant for the springs in the locking device according to the invention, it is possible to adapt the damping characteristics to the individual requirements.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
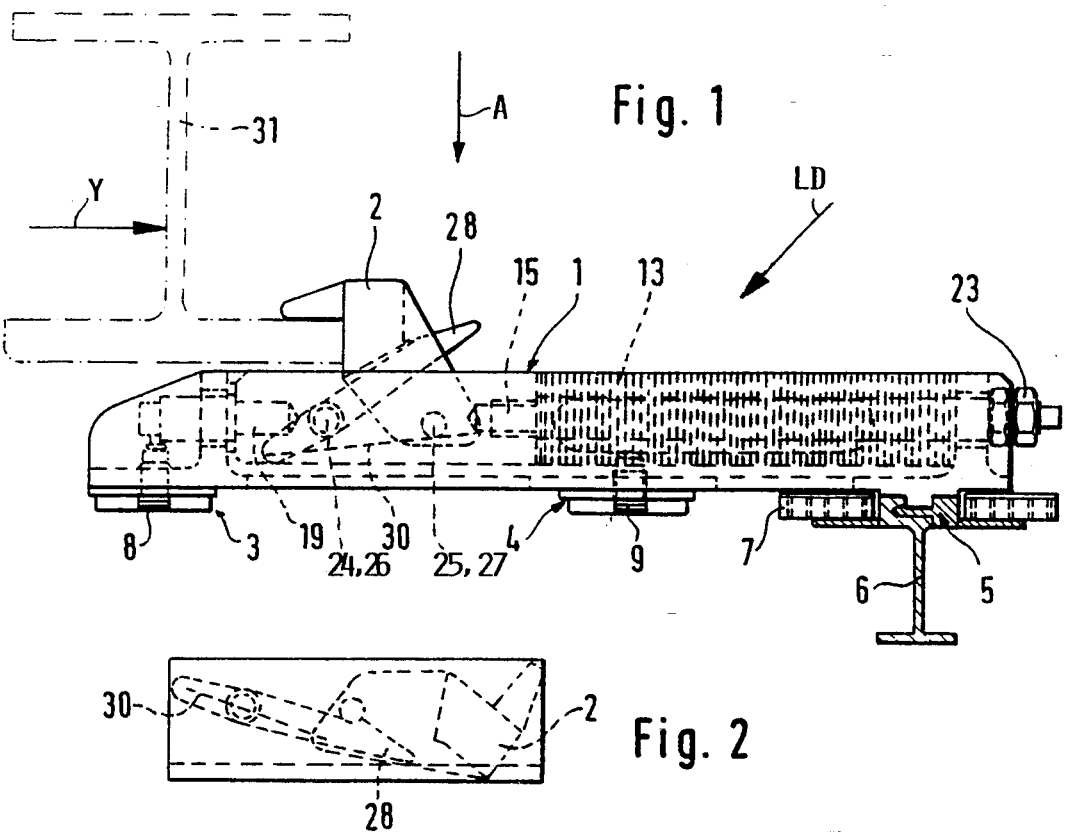
FIG. 1 shows a side view of the locking device according to the invention, with its latching hook engaging a pallet frame.
Figure 3:
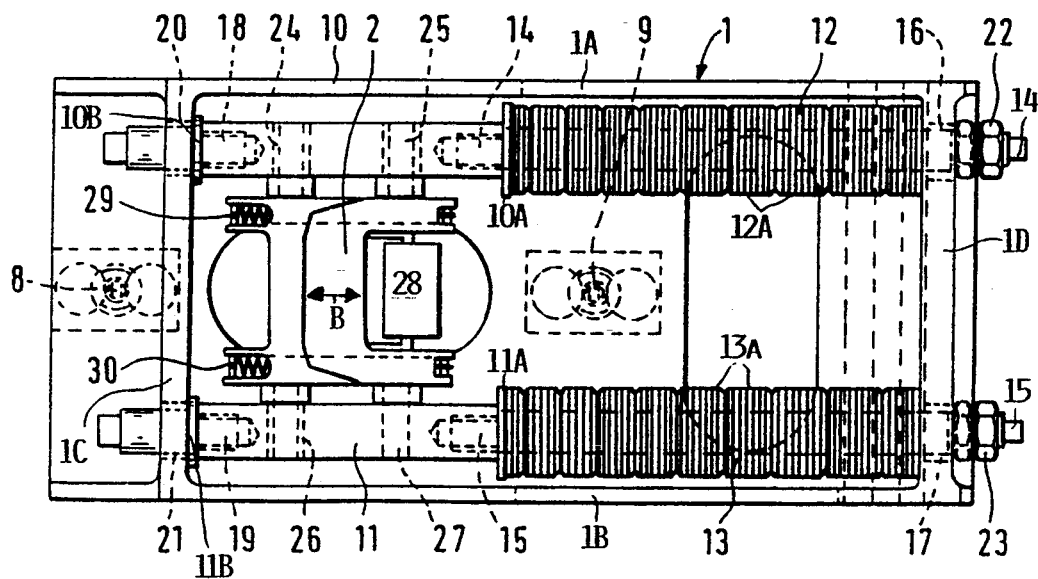
FIG. 3 is a top plan view in the direction of the arrow A in FIG. 1.

FIG. 1 shows the locking device LD with a frame 1 in which a latching hook 2 is mounted for yielding in the Y-direction when a piece of freight 31 impacts the latching hook 2. As shown in FIG. 3 the frame 1 is formed by two long side walls 1A and 1B interconnected by two short crosswalls 1C and 1D. Conventional securing devices 3, 4, and 5 make it possible to lock the frame 1 to the support rails 6 arranged in the loading floor 7. Only one support rail 6 is shown in FIG. 1. The securing devices 3 and 4 are, for example, provided with threaded counterplates which are engaged by threaded bolts 8 and 9 respectively for securing the frame 1 in slots of the respective support rail. The support rails are arranged at substantially uniform spacing in the loading floor and extend in parallel to the longitudinal aircraft X-axis. The size and positioning of the counterplates of the securing devices are adapted to the respective size and position of perforation rasters in the support rails 6.

Referring to FIG. 3, the latching hook 2 is mounted in the frame 1 for a spring biased movement in the direction of the double arrow B. For this purpose, two mounting bars 10 and 11 are movably guided inside the frame 1 in parallel to the sidewalls 1A and 1B. The left-hand end of the mounting bar 10 is slideably guided with a guide pin 18 slideably secured in bore 20 in crosswall 1C and extending axially into a threaded bore of the mounting bar 10. A flange 10B rigidly secured to the bar 10 forms a stop that limits leftward axial movement of the mounting bar 10. The right-hand end of the mounting bar 10 is provided with a flange 10A bearing against a package of biasing springs 12 mounted on a guide bar 14. The flange 10A forms a stop that limits rightward movement of the mounting bar 10. The left-hand end of the guide bar 14 is screwed into a threaded axial bore of the bar 10 in axial alignment with the guide pin 18. The right-hand end of the guide bar 14 passes slidingly through a guide bore 16 in the crosswall 1D of the frame 1. The right-hand end of the guide bar 14 is also threaded and carries two nuts 22 acting as counternuts relative to each other, but permitting an axial movement of the guide bar 14 and thus of the mounting bar 10. As shown, the mounting bar 10 and thus the latching hook 2 has assume its leftmost position. The mounting bar 11 also has flanges 11A, 11B bearing against a package of biasing springs 13 and against crosswall 1C respectively thereby forming stops that keep axial movements of the mounting bar 11 within limits. The left-hand end of the mounting bar 11 is guided by a guide pin 19 and the right-hand end is screwed onto a guide bar 15 carrying the springs 13. The right-hand end of the guide bar 15 slidingly passes through a guide bore 17 in the crosswall 1D. Counternuts 23 on the outer end of the guide bar 15 function in the same manner as the nuts 22. The guide bores 16, 17 and the guide pins 18, 19 form axial movement permitting mounts for the mounting bars 10, 11.

The latching hook 2 comprises mounting stubs received in crossbores 24 and 25 in the mounting bar 10, and further mounting stubs received in crossbores 26 and 27 in the mounting bar 11. Thus, any force applied to the latching hook 2 is transferred to the axially movable mounting bars 10 and 11. The movement to the right in FIG. 3 is biased by the packages of springs 12 and 13. Rather than slidingly guiding the guide pins 18 and 19 in the crosswall 1C, it is also possible to rigidly secure these pins 18 and 19 in respective bores 20 and 21 in the crosswall 1C and to slide the guide pins 18 and 19 axially into holes of mounting bars 10 and 11 respectively. In both possibilities, a linear guide is provided for the mounting bars 10 and 11, whereby the movement range is adjustable by positioning the counternuts 22 and 23 on the outer ends of the guide bolts 14 and 15 respectively.

Figure 2:
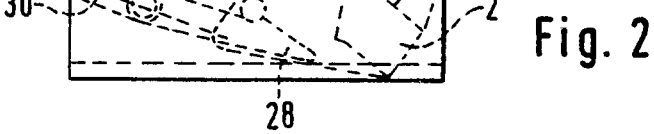
FIG. 2 illustrates the latching hook in its recessed position below the level of the loading floor.

A latch pawl 28 is also mounted with the latching hook 2 to the mounting bars 10 and 11 respectively. Both, the latching hook 2 and the latch pawl 28 are journalled on respective shafts and interconnected by two tension springs 29 and 30. These springs 29 and 30 bias the latching hook 2 into the clamping position shown in FIG. 1, whereby the pawl 28 tends to hold the hook 2 in the locked position until a downward force is applied to the pawl 28. Such a downward force must be large enough to overcome the biasing of the springs 29, 30 to bring the locking device with its hook 2 and latch pawl 28 into the recessed position shown in FIG. 2. In this position the biasing springs 29 and 30 are relaxed.

In operation, the present locking device LD is, for example, install on the loading floor 7 opposite a loading gate so that the frame 1 extends in the Y-direction perpendicularly to the length X-direction of the aircraft. Thus, the frame 1 also extends crosswise to the support rails 6 and assumes with its latching hook 2 the position of a Y-latch or the position of a YZ-latch. The Z-direction extends up-wardly and perpendicularly to the floor 7. If now a load 31 contacts the hook 2, as shown in FIG. 1, the hook 2 intercepts the load with a biasing damping force as long as the load has not yet been turned, for whatever reasons, through an angle of 90° in its movement direction. Thus, the hook 2 with its biasing springs 12 and 13 dampens the impact. The yielding motion of the hook 2 is limited by the damping action of the compression springs 12 and 13, whereby the piece of freight 31 is stopped without applying a hard impact to the frame 1 of the hook 2. Thus, hard impacts are not introduced into the loading floor 7, thereby avoiding damage. Similarly, the freight 31 is prevented from impacting on the opposite inner wall of the aircraft body.

By properly selecting the spring characteristics of the stacked springs 12, 13, it is possible to adapt the damping ability to the individual requirements, such as may be imposed by different types of loads. Preferably, springs 12, 13 are cup springs or leaf springs in packages 12A, 13A.

Although the invention has been described with reference to specific example embodiments, it will be appreciated that it ins intended to cover all modifications and equivalents within the scope of the appended claims.

What we claim is:

1. A locking device for securing a piece of freight on a loading floor in an aircraft, comprising a frame including two long side walls and two short end walls forming a rectangular frame, securing means for releasably attaching said frame to support rails in said loading floor, a latching hook (2), two parallel mounting bars (10, 11) extending in parallel to said long frame side walls and mounting said latching hook in said rectangular frame, axial movement permitting mounts (16, 18; 17, 19)

mounting each end of each parallel mounting bar in said short end walls for an axial movement in an axial direction parallel to said long side walls of said rectangular frame, two stops (10A, 10B; 11A, 11B) as part of each of said parallel mounting bars (10,11), each stop limiting axial movement of its mounting bar in one direction but not in the opposite direction and vice versa, and biasing springs (12, 13) mounted on said mounting bars for biasing said latching hook in said rectangular frame against said axial movement, whereby an impact of a load against said latching hook is damped in said axial direction.

2. The locking device of claim 1, wherein said securing means secure said rectangular frame to said support rails so that said rectangular frame and said axial movement of said latching hook extend crosswise to said support rails in a Y-direction of said aircraft.

3. The locking device of claim 1, wherein said biasing springs are cup Belleville springs arranged in two stacks through which said parallel mounting bars pass respectively.

4. The locking device of claim 1, wherein said biasing springs are leaf springs arranged in a stack one on each parallel mounting bar.

5. The locking device of claim 1, wherein said biasing springs are spring elements arranged in spring packets one on each parallel mounting bar.

6. The locking device of claim 1, wherein each of said two parallel mounting bars comprises a mounting section and a guide section, each guide section extending in axial alignment with the respective mounting section, said biasing springs comprising compression springs mounted on said guide sections, and journals securing said latching hook (2) to said mounting sections of said parallel mounting bars.

7. The locking device of claim 6, wherein said biasing springs form two compression spring packets one of which is movably mounted on each guide section of said parallel mounting bars, and wherein one of said two stops on each parallel mounting bar comprises a shoulder or flange (10A, 11A) secured on said mounting bar (10, 11) in a fixed position between said mounting section and said guide section, said shoulder or flange bearing against one end of a respective biasing spring packet the other end of said spring packet bearing against a respective short wall of said rectangular frame.

8. The locking device of claim 1, wherein said axial movement permitting mounts comprise axial guide pins (18, 19) secured to at least one of said short end walls for holding at least one end of said parallel mounting bars to permit an axial sliding movement of said parallel mounting bars.

9. The locking device of claim 1, wherein said axial movement permitting mounts comprise axial guide bores (16, 17) in at least one of said short end walls, each of said mounting bars slidingly extending with one end through one of said axial guide bores.

* * * * *